US005219491A

United States Patent [19]

Kühl

[11] Patent Number: 5,219,491

[45] Date of Patent: Jun. 15, 1993

[54] STABLE AQUEOUS FORMULATIONS OF PYRAZOLINE FLUORESCENT WHITENING AGENTS

[75] Inventor: Eickhard Kühl, Rheinfelden-Eichsel, Fed. Rep. of Germany

[73] Assignee: Ciba-Geigy Corporation, Ardsley, N.Y.

[21] Appl. No.: 514,628

[22] Filed: Apr. 25, 1990

[30] Foreign Application Priority Data

May 2, 1989 [CH] Switzerland ........................ 1664/89

[51] Int. Cl.[5] ........................................ C09K 11/06

[52] U.S. Cl. ............................ 252/301.27; 252/543; 8/573

[58] Field of Search .................. 252/301.27, 543, 542; 8/573

[56] References Cited

U.S. PATENT DOCUMENTS

| | | | |
|---|---|---|---|
| 4,003,889 | 1/1977 | Bolton | 252/301.27 |
| 4,129,563 | 12/1978 | Patsch | 252/301.27 |
| 4,183,853 | 1/1980 | Schroeder | 252/301.27 |
| 4,816,590 | 3/1989 | Meyer | 8/109 |
| 4,904,794 | 2/1990 | Meyer | 8/573 |

*Primary Examiner*—Prince Willis, Jr.
*Assistant Examiner*—Alan D. Diamond
*Attorney, Agent, or Firm*—Marla J. Mathias; George R. Dohmann

[57] ABSTRACT

Stable formulations of fluorescent whitening agents (fwas) containing a) a fluorescent whitening agent of the pyrazoline series
b) 0.1–10 mol %, relative to the fluorescent whitening agent of one or more reducing sulfur compounds
c) if appropriate, auxiliaries and
d) water, a process for their preparation and the use of formulations of this type for the whitening of textiles are described.

18 Claims, No Drawings

STABLE AQUEOUS FORMULATIONS OF PYRAZOLINE FLUORESCENT WHITENING AGENTS

The present invention relates to stable aqueous formulations of fluorescent whitening agents (fwas), a process for their preparation and their use.

Fwas are nowadays increasingly commercialized in the form of aqueous solutions. In the case of fwas of the pyrazoline series, in particular of the cationic ones, a constant yellow discolouration of solutions of this type is observed upon storage.

Surprisingly, it has now been found that the "discolouration" of the solutions can be prevented or at least delayed considerably if a reducing sulfur compound is added to the aqueous solution of the fwa.

Accordingly, the formulations according to the invention are characterized by a) a fwa of the pyrazoline series
b) 0.1–10 mol %, relative to the fwa of a reducing sulfur compound
c) if appropriate, auxiliaries and
d) water.

These formulations are preferably solutions.

Examples of fwas of the pyrazoline series are those of the formula

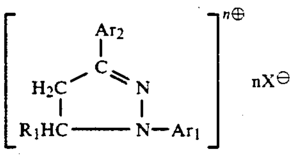
(I)

in which $Ar_1$ and $Ar_2$, independently of one another, are substituted or unsubstituted aryl radicals, $R_1$ is hydrogen or methyl, n is zero or 1 and X is a colourless anion.

Of particular interest are:

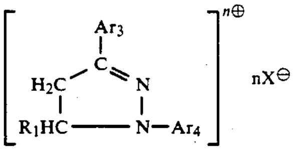
(II)

in which $Ar_3$ and $Ar_4$, independently of one another, are phenyl, diphenyl or naphthyl radicals which can carry further substituents such as hydroxyl, $C_1$–$C_6$alkyl, $C_1$–$C_6$alkoxy, hydroxyalkyl, amino, alkylamino, acylamino, carboxyl, sulfonic acid, sulfonyl and sulfonamido groups, including the esterified derivatives and/or halogen atoms, $R_1$, n and X are as defined above.

Particularly suitable are:

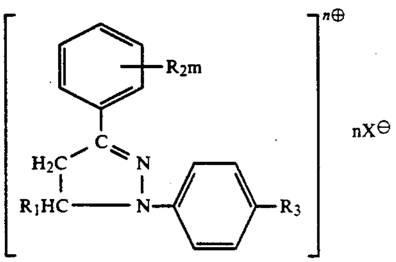
(III)

in which $R_2$ is hydrogen, halogen or $C_1$–$C_6$alkyl, $R_3$ is a substituted or unsubstituted $C_1$–$C_6$alkyloxycarbonyl, $C_1$–$C_6$alkylsulfonyl, sulfonamido or a sulfonyl group, m is zero, 1, 2 or 3, and $R_1$, n and X are as defined above.

Particular preference is given to:

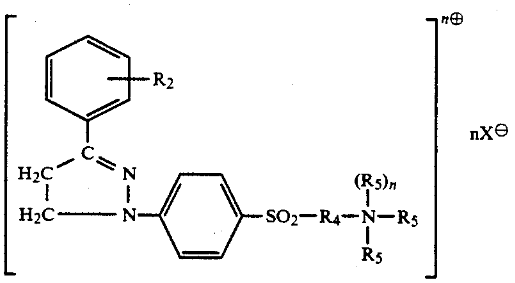
(IV)

in which $R_4$ is substituted or unsubstituted $C_1$–$C_6$alkyl, $C_1$–$C_6$alkyleneoxy-$C_1$–$C_6$alkylene, $C_1$–$C_6$alkylene-CONH-$C_1$–$C_6$alkylene and the $R_5$, independently of one another, are substituted or unsubstituted $C_1$–$C_6$alkyl or hydrogen and $R_2$, n and X are as defined above.

Very particularly preferably, the formulations are characterized by a) a cationic fwa of the 1,3-diphenyl-2-pyrazoline series
b) 0.1–10 mol %, relative to the fwa of one or more reducing sulfo compounds
c) if appropriate, auxiliaries and
d) water Examples of fwas of the 1,3-diphenyl-2-pyrazolines are cationic representatives of the formula

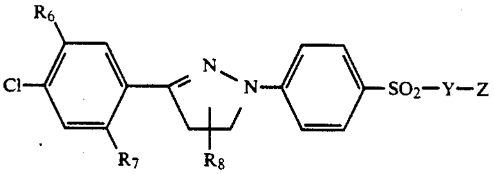
(V)

in which Y is a bridge member and Z is a dialkylamino, di(hydroxyethyl)amino, morpholino, pyrrolidino, piperidino, N-alkylpiperazino, N-hydroxyethylpiperazino or an alkylmercapto group which are protonated or quaternized. The bridge members Y can be straight-chain or branched alkylene, sulfonyl, sulfonamido, carboxamido, carboxyl, amino, hydroxyalkylene groups, $R_6$ and $R_7$, independently of one another, can be H, methyl or chlorine and $R_8$ can be $C_1$–$C_4$alkyl or phenyl.

Preferred compounds are of the formula

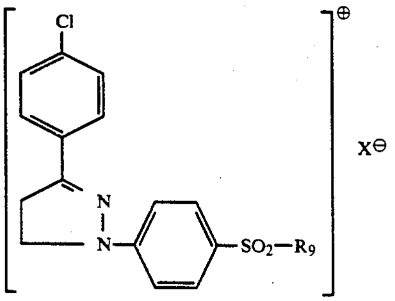
(VI)

in which $R_9$ is a basic radical

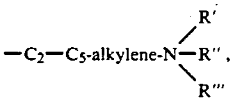

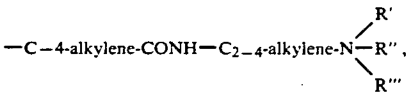

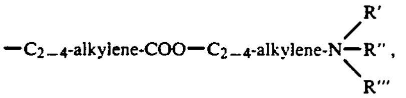

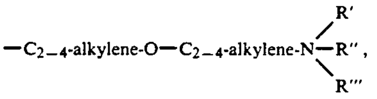

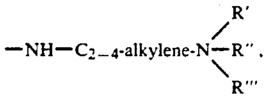

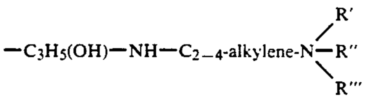

or

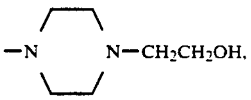

$X^-$ is a colourless anion of an organic or inorganic acid, R', R'', R''', independently of one another, are H, $-CH_3$, $-C_2H_5$ or $-CH_2CH_2OH$, of which 2 radicals together can also form a pyrrolidine, piperidine, N-methylpiperazine or morpholine ring. One radical is preferably hydrogen.

Suitable halogens are in particular fluorine, chlorine and bromine, but especially chlorine.

Suitable $C_1$–$C_6$alkyl radicals are unbranched and branched alkyl radicals, such as a methyl, ethyl, propyl, butyl, pentyl or hexyl radical.

Examples of colourless anions $X^\ominus$ are $C_{1-3}$alkanoates, $C_{1-4}$alkanephosphonates, $C_{1-4}$alkanesulfonates, $C_{2-3}$hydroxyalkanoates, phosphite, sulfamate, halides, methosulfate, p-toluenesulfonate, preferably those which generate good water solubility.

The salts of these basic or cationic compounds serve in particular for the whitening of polyacrylonitriles. Due to the structure and the type of the anion, they can be used as concentrated aqueous solutions, e.g. in commercial forms.

The reducing sulfur compounds according to the invention can be derived from organic and inorganic classes of compounds and are preferably water-soluble. Thus, for example, dithionites, pyrosulfites, sulfites, sulfides, thiosulfates and thiocyanates (e.g. potassium thiocyanate) are suitable in the form of their salts (e.g. alkali metal salts, alkaline earth metal salts or ammonium salts) as aqueous solutions or even in solid form or, if known, also in the form of the free acids or their anhydrides, such as sulfur dioxide. Suitable representatives of organic compounds are mercaptans, such as thioglycolic acid, mercaptoethanol, 4-hydroxy-2-mercapto-6-methylpyrimidine, mercaptothiazoline, thiodialkanoic acids, such as thiodipropionic acid, dithiodialkanoic acids, such as 3,3'-dithiodipropionic acid, sulfinates, such as sodium formaldehydesulfoxylate or formamidinosulfinic acid and thiourea. Na dithionite is particularly preferred.

The amount of sulfur compound is 0.1–10 mol %, preferably 0.5–5 mol %, relative to the fwa. However, it is possible to exceed these ranges in the case of formulations of very high concentration or very low concentration.

If appropriate, further auxiliaries can be added to the formulation, which can be solution-stabilizing, hydrotropic agents or, alternatively, other substances which are advantageous for the later use of the formulation.

Formulations according to the invention are obtained, for example, by mixing the synthesis solution, the moist filter cake or even the dry powder of a fwa of the pyrazoline series in an amount of 10–60% by weight, relative to the total weight of the formulation, with 0.1–10 mol %, relative to the fwa of a reducing sulfur compound, water and, if appropriate, auxiliaries and homogenizing the mixture. Sulfur dioxide is introduced directly into the aqueous solution.

The desired content of the fwa in the solution can be adjusted either by the addition of water, solution of fwa, further dry fwa powder or other auxiliaries. This adjustment can be carried out before, during, or after the addition of the sulfur compound. The amount of the fwa is preferably 10–30% by weight, relative to the total weight of the formulation.

The fwa formulation according to the invention is used, for example, for the whitening of textiles, preferably for the spinning of polyacrylonitrile in the gel phase.

The fwa formulation according to the invention can also be incorporated into a detergent, for example by running the required amount of the solution from a container into a mixing apparatus which contains a suspension or solution of the detergent.

The present invention accordingly also relates to the use of the fwa formulation according to the invention for the preparation of detergents and to the detergents obtained thereby, characterized in that a suspension of customary detergents is mixed with a fwa solution according to the invention and dried. Advantageously, the suspensions obtained are dried by subjecting them to a spray-drying process. Furthermore, the fwa formulation according to the invention can be used for the preparation of liquid detergents.

The examples which follow illustrate the invention without limiting it thereto. RT denotes room temperature.

The degree of discolouration is given by the difference of the absorption value measured at 465 nm at the beginning and the end of the storage test.

EXAMPLE 1

5 mol % of Na dithionite are added to an aqueous solution containing 18% by weight of a fwa of the formula

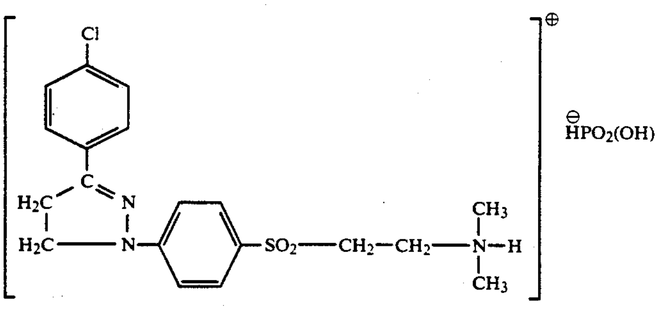

(100)

and the mixture is homogenized.

The solution does not show any discolouration even after storage for 2 months at room temperature (RT).

Similar stabilities are obtained by adding one of the following compounds to the above solution instead of Na dithionite: potassium thiocyanate, thioglycolic acid, mercaptoethanol, 4-hydroxy-2-mercapto-6-methyl-pyrimidine, 2-mercaptothiazoline, sodium formaldehydesulfoxylate, formamidinosulfinic acid, thiourea, thiodipropionic acid or 3,3'-dithiodipropionic acid.

EXAMPLE 2

Example 1 is repeated, except that only 1 mol % of Na dithionite is added to the solution of fwa.

The solution shows only slight discolouration after storage for 2 months at RT.

EXAMPLE 3

5 mol % of Na dithionite are added to an aqueous solution containing the fwa of the formula

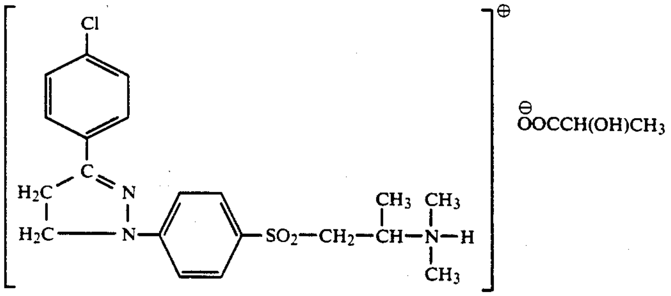

(200)

and the mixture is homogenized.

The solution does not show any discolouration even after storage for 2 months at RT.

EXAMPLE 4

5 mol % of Na dithionite are added to an aqueous solution containing the fwa of the formula

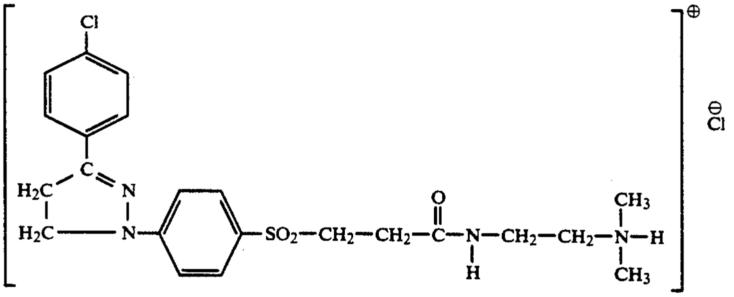

(300)

and the mixture is homogenized.

The solution does not show any discolouration even after storage for 2 months at RT.

EXAMPLE 5

5 mol % of Na dithionite are added to an aqueous solution containing the fwa of the formula

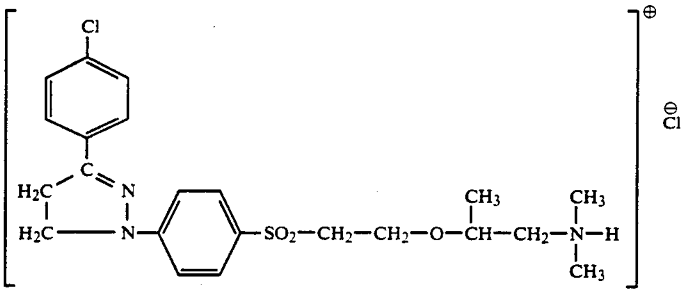

(400)

and the mixture is homogenized.

The solution does not show any discolouration even after storage for 2 months at RT.

COMPARATIVE EXAMPLE

If no reducing sulfur compound is added to a solution of the fwa according to Example 1 or 3, these solutions show strong discolouration after storage for as little as three weeks.

What is claimed is:

1. A stable formulation of a fluorescent whitening agent, which comprises a) 10-60% by weight, relative to the total weight of the formulation, of a pyrazoline fluorescent whitening agent, b) 0.1-10 mol %, relative to the fluorescent whitening agent, of a stabilizing compound to prevent discoloration of the formulation during storage, said stabilizing compound being selected from the group consisting of reducing sulfur compounds, and c) water.

2. A stable formulation of a fluorescent whitening agent according to claim 1, wherein the fluorescent whitening agent has the formula

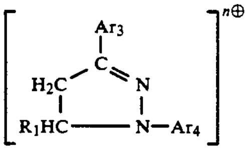

(II)

in which $Ar_3$ and $Ar_4$, independently of one another, are unsubstituted phenyl, diphenyl or naphthyl radicals or phenyl, diphenyl or naphthyl radicals which are substituted by hydroxyl, $C_1$-$C_6$-alkyl, $C_1$-$C_6$-alkoxy, hydroxyalkyl, amino, alkylamino, acylamino, carboxyl, sulfonic acid, sulfonyl, sulfonamido or halogen $R_1$ is hydrogen or methyl, n is zero or 1 and X is a colorless anion.

3. A stable formulation of a fluorescent whitening agent according to claim 1, wherein the fluorescent whitening agent has the formula

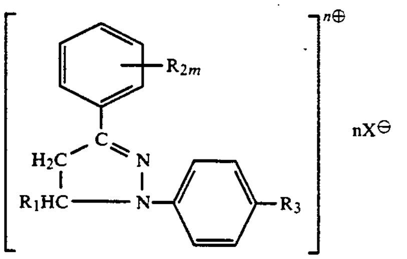

(III)

in which $R_2$ is hydrogen, halogen or $C_1$-$C_6$alkyl, $R_3$ is a substituted or unsubstituted $C_1$-$C_6$alkyloxycarbonyl, $C_1$-$C_6$alkylsulfonyl, sulfonamido or a sulfonyl group, m is zero, 1, 2 or 3, $R_1$ is hydrogen or methyl n is zero or 1 and X is a colorless anion.

4. A stable formulation of a fluorescent whitening agent according to claim 1, wherein the fluorescent whitening agent has the formula

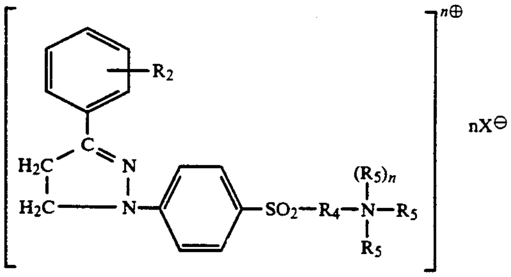

(IV)

in which $R_4$ is substituted or unsubstituted $C_1$-$C_6$alkyleneoxy-$C_1$-$C_6$alkylene, $C_1$-$C_6$alkylene-CONH-$C_1$-$C_6$alkylene and the $R_5$, independently of one another, are substituted or unsubstituted $C_1$-$C_6$alkyl or hydrogen, $R_2$ is hydrogen, halogen or $C_1$-$C_6$alkyl, n is zero or 1 and X is a colorless anion.

5. A stable formulation of claim 1 wherein the fluorescent whitening agent is a 1,3-diphenyl-2-pyrazoline fluorescent whitening agent.

6. A stable formulation of a fluorescent whitening agent according to claim 5, wherein the fluorescent whitening agent has the formula

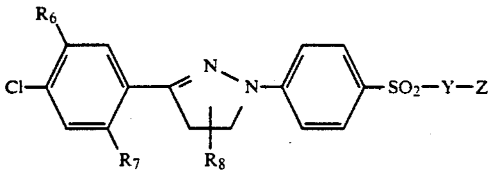

(V)

in which Y is a bridge member and Z is a protonated or quaternized dialkylamino, di(hydroxyethyl)amino, morpholino, pyrrolidino, piperidino, N-alkylpiperazino, N-hydroxyethylpiperazino or an alkylmercapto group, Y is a straight-chain or branched alkylene, amino, hydroxyalkylene group, $R_6$ and $R_7$, independently of one another, is H, methyl or chlorine and $R_8$ is $C_1$–$C_4$alkyl or phenyl.

7. A stable formulation of a fluorescent whitening agent according to claim 5, wherein the fluorescent whitening agent has the formula

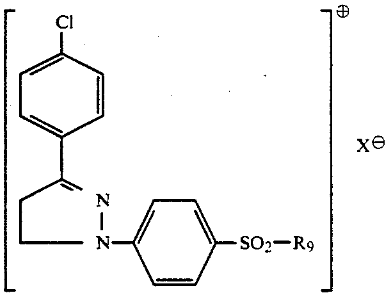

(VI)

in which $R_9$ is a basic radical

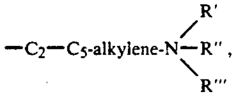

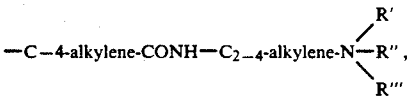

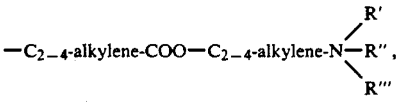

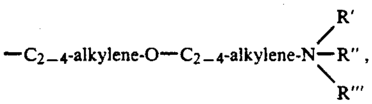

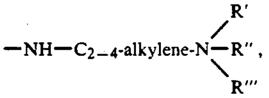

-continued

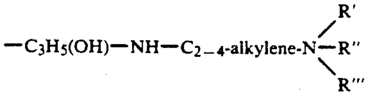

or

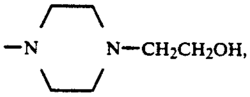

$X^-$ is a colourless anion of an organic or inorganic acid, R', R'', R''', independently of one another, is H, $-CH_3$, $-C_2H_5$ or $-CH_2CH_2OH$, of which 2 radicals together can also form a pyrrolidine, piperidine, N-methylpiperazine or morpholine ring.

8. A stable formulation of a fluorescent whitening agent according to either claim 1 or claim 7, wherein the sulfur compound is selected from the group consisting of Na dithionite, potassium thiocyanate, thioglycolic acid, mercaptoethanol, 4-hydroxy-2-mercapto-6-methylpyrimidine, 2-mercaptothiazoline, sodium formaldehydesulfoxylate, formamidinosulfinic acid, thiourea, thiodipropionic acid or 3,3'-dithiodipropionic acid.

9. A stable formulation of a fluorescent whitening agent according to either claim 1 or claim 7, wherein the sulfur compound is added in an amount of 0.5–5 mol %, relative to the fluorescent whitening agent.

10. A stable formulation of a fluorescent whitening agent according to either claim 1 or claim 7 wherein the sulfur compound is Na dithionite.

11. A stable formulation of a fluorescent whitening agent according to claim 1, which contains a) 18% by weight of a fluorescent whitening agent of the formula

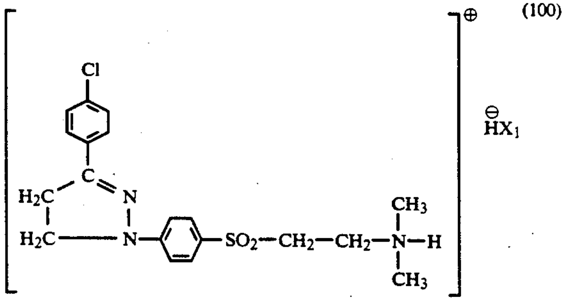

(100)

in which $X_1^\ominus$ is $HPO_2(OH)$ or HCOO, b) 5 mol % of Na dithionite, c) water.

12. A stable formulation of a fluorescent whitening agent according to claim 1, which contains a) a fluorescent whitening agent of the formula

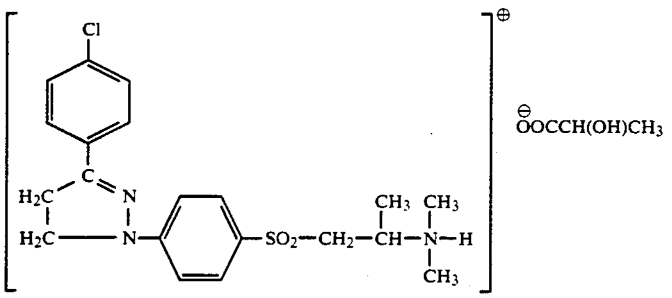

(200)

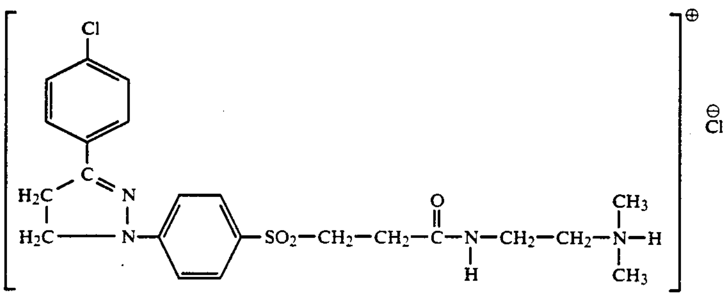

(300)

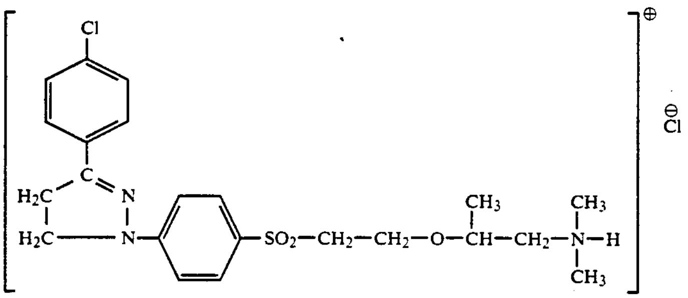

(400)

b) 0.5-5 mol % of Na dithionite,

13. A stable formulation of a fluorescent whitening agent according to either claim 1 or claim 7 wherein the reducing sulfur compound is selected from the group consisting of dithionites, pyrosulfites, sulfites, thiosulfates, thiocyanates, mercaptans, thiodialkanoic acids, dithiodialkanoic acids and sulfinates, their alkali metal, alkaline earth metal or ammonium salts or their free acids.

14. A stable formulation of a fluorescent whitening agent according to claim 1, which further comprises a solution-stabilizing, hydrotropic agent.

15. A process for the preparation of stable formulations of fluorescent whitening agents according to either claim 1 or claim 7, wherein the fluorescent whitening agent of the pyrazoline series is mixed in an amount of 10-60% by weight, relative to the total weight of the formulation, with 0.1-10 mol %, relative to the fluorescent whitening agent of a reducing sulfur compound and water, and the mixture is homogenized.

16. A method of stabilizing aqueous formulations of pyrazoline fluorescent whitening agents which comprises preventing discoloration of the formulation by adding 0.1 to 10 mol percent, relative to the fluorescent whitening agent, of a reducing sulfur compound to the formulation.

17. A method of claim 16 wherein the reducing sulfur compound is selected from the group consisting of dithionites, pyrosulfites, sulfites, sulfides, thiosulfates, thiocyanates, mercaptans, thiodialkanoic acids, dithiodialkanoic acids and sulfinates.

18. A method of claim 17 wherein the reducing sulfur compound is sodium dithionite.

* * * * *